(12) United States Patent
Tokarski et al.

(10) Patent No.: US 12,115,744 B2
(45) Date of Patent: Oct. 15, 2024

(54) METHOD AND SYSTEM FOR PRODUCING A GRADIENT POLAR FILM

(71) Applicant: ESSILOR INTERNATIONAL, Charenton-le-Pont (FR)

(72) Inventors: Zbigniew Tokarski, Dallas, TX (US); Eric Begg, Dallas, TX (US); Srinivasan Balasubramanian, Dallas, TX (US); Hao-Wen Chiu, Dallas, TX (US)

(73) Assignee: Essilor International, Charenton-le-pont (FR)

( * ) Notice: Subject to any disclaimer, the term of this patent is extended or adjusted under 35 U.S.C. 154(b) by 660 days.

(21) Appl. No.: 17/416,899

(22) PCT Filed: Dec. 9, 2019

(86) PCT No.: PCT/EP2019/084257
§ 371 (c)(1),
(2) Date: Jun. 21, 2021

(87) PCT Pub. No.: WO2020/126622
PCT Pub. Date: Jun. 25, 2020

(65) Prior Publication Data
US 2022/0055327 A1    Feb. 24, 2022

(30) Foreign Application Priority Data
Dec. 21, 2018    (EP) ................................. 18306819

(51) Int. Cl.
*B29D 11/00* (2006.01)
*G02C 7/12* (2006.01)

(52) U.S. Cl.
CPC ......... *B29D 11/00644* (2013.01); *G02C 7/12* (2013.01); *B29K 2995/0034* (2013.01)

(58) Field of Classification Search
CPC .............. B29D 11/00644; B29K 2995/0034
See application file for complete search history.

(56) References Cited

U.S. PATENT DOCUMENTS

| 2,547,736 A | 4/1951 | Blake |
| 3,964,910 A * | 6/1976 | Geist .................. G03C 5/04 430/494 |

(Continued)

FOREIGN PATENT DOCUMENTS

WO    2008/111995    9/2008

OTHER PUBLICATIONS

International Search Report for PCT/EP2019/084257, mailed Jan. 31, 2020, 3 pages.

(Continued)

*Primary Examiner* — S. Behrooz Ghorishi
*Assistant Examiner* — Alexander A Wang
(74) *Attorney, Agent, or Firm* — NIXON & VANDERHYE

(57) ABSTRACT

A system and method for manufacturing an ophthalmic lens is provided. The method involves preparing a cross-polarization cancelling optical film for an optical article comprising providing a film having at least a first section comprising a first edge, a second section comprising a second edge, and a predetermined color intensity; providing an apparatus, wherein the apparatus comprises at least a first roller and a second roller, wherein the first roller and the second roller are configured to stretch at least a portion of the film; and continuously and asymmetrically stretching at least a portion of the film using the apparatus, while substantially maintaining the color intensity of the film.

12 Claims, 8 Drawing Sheets

(56) References Cited

U.S. PATENT DOCUMENTS

| | | | |
|---|---|---|---|
| 4,808,357 A * | 2/1989 | Bourcier | B32B 17/10981 |
| | | | 264/281 |
| 4,859,039 A | 8/1989 | Okumura et al. | |
| 4,992,218 A | 2/1991 | Sugio et al. | |
| 5,051,309 A | 9/1991 | Kawaki et al. | |
| 5,071,906 A | 12/1991 | Tanaka et al. | |
| 5,326,507 A | 7/1994 | Starzewski | |
| 5,582,916 A | 12/1996 | Ohtsu et al. | |
| 6,113,811 A | 9/2000 | Kausch et al. | |
| 2002/0023325 A1 * | 2/2002 | Fant | B44C 5/0446 |
| | | | 27/2 |
| 2007/0052918 A1 | 3/2007 | Tendler | |
| 2012/0327512 A1 | 12/2012 | Goto et al. | |
| 2015/0261011 A1 | 9/2015 | Trapani et al. | |

OTHER PUBLICATIONS

Written Opinion of the ISA for PCT/EP2019/084257, mailed Jan. 31, 2020, 5 pages.

* cited by examiner

METHOD AND SYSTEM FOR PRODUCING A GRADIENT POLAR FILM

This application is the U.S. national phase of International Application No. PCT/EP2019/084257 filed 9 Dec. 2019, which designated the U.S. and claims priority to EP Patent Application No. 18306819.6 filed 21 Dec. 2018, the entire contents of each of which are hereby incorporated by reference.

FIELD OF THE DISCLOSURE

The present disclosure relates generally to methods and systems for manufacturing films for optical articles. More particularly, this present disclosure pertains to a method and system for stretching optical films, the stretched optical film produced therefrom, and an optical article incorporating such an optical film.

BACKGROUND

Gradient polar films can be used for optical articles, such as ophthalmic lenses, polarized sun lenses, and other types of lenses. Polarized sun lenses for outdoor use allow vertically polarized components of light to be transmitted, which is preferable for clear vision, while eliminating the horizontally polarized component of light. Vertically aligned light is preferable because it is aligned with the natural tendency of the human eye to focus on the vertical component of an image. The use of gradient polar films for polarized lenses, in particular, when used outdoors by the human eye to view devices such as smart phones, GPS devices, tablets, gas pump user interfaces, vehicle or airplane dashboard displays, and other devices with polarized displays, can be challenging for a wearer due to "cross-polarization" effects. This happens when an image appears black due to cross polarization between the polarization of the polarized displays and the polarization of the sunglasses. During cross-polarization, the polarization direction of sunglasses is perpendicular to that of the polarization used for the image being viewed by a viewer.

To address this problem, there is a need for an improved optical film that can be used in an optical article, such as an ophthalmic lens, and more particularly a polarized lens. The optical article described herein can be an ophthalmic or plano lens that can be used for health and/or sun filter applications. What is provided herein is a new method to make an improved gradient polarized film for such ophthalmic lenses using a variable or differential stretching method to manufacture the optical film. Such lenses can be prepared by casting, injection molding, or additive manufacturing and can optionally be further tinted using a separate, subsequent tinting process.

The differential stretching process described herein used to produce optical films involves continuously and asymmetrically stretching dyed films comprising, for example, poly(vinyl alcohol) (PVA), poly(ethylene terephthalate), or other polar matrix materials, in a continuous roll-to-roll web conveying stretching process, in which a film is moved from one converting process to another in a continuous roll-to-roll or die-to-roll machine. Converting is the change in structure or composition of the film, e.g., coating, lamination, stretching, etc. In this method, a gradient polarized film can be produced that has a first portion that is stretched to provide maximum polarization while a second portion of the film is minimally stretched such that there is little or no polarization in the second portion of the film.

The method of preparing a gradient polar film disclosed herein involves changing the geometry of drawing nip rollers used in a roller stretching system from substantially cylindrically shaped to substantially conically shaped or frusto-conical for the stretching of such film. The resulting stretched film has a target stretch ratio and polarization efficiency (PE) that increases from one edge of the film to the opposite edge, while maintaining the color intensity throughout the optical film during the manufacturing process. Hence, a polarizing film having a gradually, continuously changing polarization efficiency (PE) from one edge of the film to the other edge is provided. It is noted, however, that the color intensity of the film will change with thickness, according to Beer's law, described herein.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

SUMMARY OF THE DISCLOSURE

A method of manufacturing is provided herein. The method involves preparing a cross-polarization cancelling optical film for an optical article comprising: providing a film having at least a first section comprising a first edge, a second section comprising a second edge, a predetermined color intensity, and a thickness; providing an apparatus, wherein the apparatus comprises at least a first roller and a second roller, wherein the first roller and the second roller are configured to stretch at least a portion of the film; and continuously and asymmetrically stretching at least a portion of the film using the apparatus, while substantially maintaining the color intensity of the film. The method further comprises providing an apparatus, wherein the first roller is a substantially cylindrical roller and the second roller is a substantially frusto-conical roller. The method further comprises stretching the film such that the thickness of the film is reduced from the first thickness to a second thickness, wherein the second thickness is less than the first thickness.

The method further comprises stretching at least a portion of the film such that at least a portion of the first section of the film has a first stretch ratio and a first polarization efficiency, and at least a portion of the second section of the film has a second stretch ratio and a second polarization efficiency. The method further comprises stretching the film such that the first stretch ratio and first polarization efficiency are greater than the second stretch ratio and second polarization efficiency.

The method further comprises stretching the film such that the total stretch ratio, comprising the first stretch ratio and the second stretch ratio, and the total polarization efficiency, comprising the first polarization efficiency and the second polarization efficiency, of the film continuously decreases from the first edge of the film to the second edge of the film. The method further comprises providing an apparatus, wherein the first roller is a substantially cylindrical roller or a substantially frusto-conical roller, and the second roller is a substantially cylindrical roller or a substantially frusto-conical roller. The method further comprises stretching at least a portion of the first section of the film such that it has a stretch ratio of between 1 and 4 and a polarization efficiency of up between 90% and 100%.

The method further comprises stretching at least a portion of the second section of the optical film such that it has a stretch ratio of less than 3.5. The method further comprises during the step of providing the film, providing pre-stretched film. The method further comprises during the step of providing the film, providing a film having a color gradient, wherein the color gradient varies continuously from the first edge of the first section of the film to the second edge of the second section. The method further comprises further processing the film using at least one of casting, injection molding, additive manufacturing, and tinting.

Also presented herein is an optical article comprising a cross-polarization cancelling optical polarized film, wherein the film comprises: at least a first section comprising a first edge, a first stretch ratio, and a first polarization efficiency, a second section comprising a second edge, a second stretch ratio, and a second polarization efficiency, wherein the first stretch ratio and first polarization efficiency are greater than the second stretch ratio and the second polarization efficiency; and a continuously decreasing polar gradient from the first edge of the film to the second edge of the film, wherein the film is continuously and asymmetrically stretched. The first polarization efficiency and the second polarization efficiency comprise a total polarization efficiency, and wherein the total polarization efficiency continuously decreases from the first edge of the film to the second edge of the film. The transmission of the film is between 8% and 85%.

BRIEF DESCRIPTION OF THE DRAWINGS

The advantages, nature, and various additional features as described herein will appear more fully upon consideration of the illustrative embodiments now to be described in detail in connection with the accompanying drawings. In the drawings like reference numerals denote similar components throughout the views.

DETAILED DESCRIPTION OF THE DISCLOSURE

Figure 1:
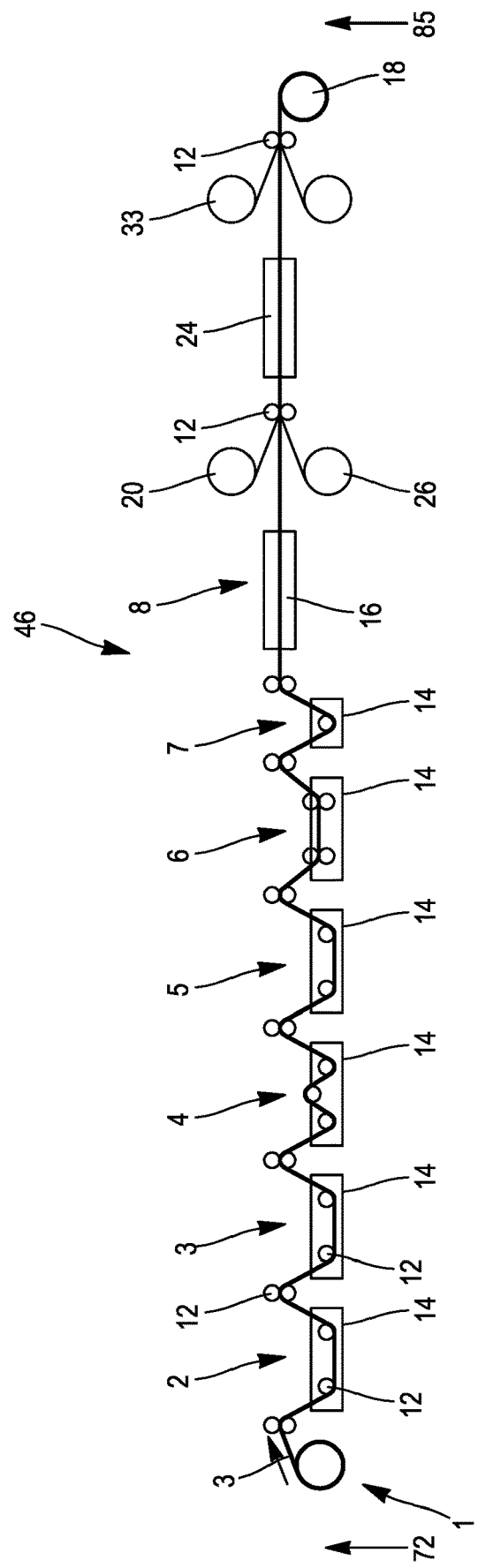
FIG. 1 illustrates a system for treating and stretching an optical film.

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values, and including the values "a" and "b" themselves.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

"Continuous" material means a relatively long, steady, sustained, unbroken or uninterrupted length of a material having a certain property or properties. A "continuous" (or "continuously") process means a process without interruptions, gaps, exceptions, or reversals.

"Conical" means having the shape of a cone having an outer surface.

"Cylindrical" means having straight parallel sides and a circular or oval cross-section; in the shape or form of a cylinder having an outer surface.

"Film" is used generically to include any materials in the form of sheets, sheeting, webs, ribbons, films, foils, rods, filaments, and threads.

"Frusto-conical" means a cone with the tip removed, e.g., having the shape of a cone with the narrow end, or tip, removed or truncated cone. A cone with a region including its apex cut off by a plane is called a truncated cone.

"Gradient" is used herein to mean a change of any optical characteristic, such as polarization efficiency or transmission, from one part of an ophthalmic lens to another. The gradients described herein are typically gradual, smooth, and continuous. However, such gradients may also be discrete and/or incremental, whether smooth or non-smooth.

"Lens" is used herein to mean an organic or inorganic glass lens, preferably an organic lens, comprising a lens substrate having one or more surfaces which may be coated with one or more coatings of various natures. As used herein, "lens blank" means a transparent medium of a known base curve, with no power, used by optical laboratories, to generate a finished spectacle lens with prescribed powers; it is used for single vision, bi- and tri-focals, and progressive additional lenses (PALs). In a non-limited aspect, the methods of the present invention can be used to prepare both transparent and non-transparent (i.e., opaque) articles and devices.

The phrase "organic solvent" means any hydrocarbon-based liquid having suitable surface tension, density, and/or immiscibility in water properties for use in the current embodiments. Exemplary organic solvents include aliphatic and aromatic hydrocarbons (e.g., ether, petroleum ether, pentane, hexane, hexanes, heptane, heptanes, octane, benzene, toluene, xylenes, etc., or mixtures thereof, or alcohols solvents, and the like).

A method and system of manufacturing an optical film for an optical article is described herein, configured according to principles of the disclosure. The optical article and process used herein can be used for any type of ophthalmic lens. In a specific embodiment, the optical article produced herein can be used for the lenses of sunglasses or for solar purposes. Such lenses may be plano or may have corrective power. The ophthalmic lens can be a polarized lens. The ophthalmic article can be formed of a plastic optical base which is the lens substrate or lens blank. The substrate can be a hydrophobic substrate or a hydrophilic substrate. Without being limited to theory, the present invention also includes optical devices and methods of manufacturing optical devices. Optical devices can include any device that can create, manipulate, or measure electromagnetic radiation such as, for example cameras, visors, binoculars, microscopes, telescopes, lasers, and the like. In certain instances, an optical device can contain an optical article, such as an ophthalmic article or lens.

"Stretching" means making an object longer or wider without tearing or breaking it.

Referring to FIG. 1, a system 46 for processing an optical film is illustrated. The system comprises a plurality of rollers 12 for conveying the film 3, and several tanks 14, positioned successively in an assembly line format. In this illustration, the rollers are generically illustrated as being the same shape or design, but other shapes or designs, such as those described herein, can be contemplated. Additionally, the rollers may have different cylinder radius dimensions. Each tank 14 contains various wet solutions for immersing the optical film 3. At least one roller 12 is positioned within a portion of each of the tanks 14. The rollers 12 can be positioned in various configurations with respect to each other and the film 3 to be treated.

The system 46 is used to process a film such as a PVA film comprising at least one dichroic dye. The PVA film can be processed, stretched, and optionally treated using other treatment methods, after which it can be used in optical articles such as ophthalmic lenses, and more particularly, sun lenses. Structures and materials for the manufacture of light polarizing films with polyvinyl alcohol (PVA) and dichroic dyes can also include those disclosed in U.S. Pat. Nos. 4,859,039, 4,992,218, 5,051,309, 5,071,906, 5,326,507, 5,582,916, and 6,113,811. These patents are incorporated herein in their entirety for their disclosure of materials, processes and structures for producing polarizing elements and layers. In this instance, a clear PVA film 3 was used (Kuraray Poval PVA film, commercially available from Kuraray Co., Ltd.). The film had a thickness of about 75 microns. However, other films may be contemplated within the scope of this invention.

The processing steps used to prepare the PVA polarized film were as follows, and as indicated by steps 1 through 8: (1) providing a clear PVA film 3, in particular a PVA film comprising at least plasticizer material. The PVA film can be optionally dried before soaking in water. The film 3 can be soaked in a first tank, followed by a second tank. This processes involved (2) swelling the clear PVA film 3 in a water bath to remove the plasticizer. The film 3 swelled by about 30% in all dimensions. The process involved further spraying or soaking at least a portion of the film 3 with a "wet solution" as it progressed through each set of rollers 12. Each of the tanks comprised a bath having at least one sprayer positioned at the exit of each bath to contain any carry-outs (e.g., contaminates, pigments) from leaving each tank. The absorption of water by the PVA film during the process allowed it to be softened to be stretchable at room temperature. In some cases, if the PVA film is not uniformly and sequentially swollen, a variation in the degree of the swelling and stretching can occur. In this case, optionally a small uniform force can be applied to the film 3 to help ensure uniform elongation and evenness and to avoid forming wrinkles in the film.

The process then further involved (3) soaking the PVA film in a water bath to remove impurities. More particularly, the PVA film was soaked in water at 25° C. for 5 min until the film contained about 70%-85% water, in order to make it soft and elastic. However, the soaking time can depend on the span length in the tank and film speed. In some embodiments, during this step, optionally water-soluble plasticizers can be removed, or optionally, additives can be preliminarily adsorbed. This process produced a clean, polarized PVA film 3 which was soft clue to its high water saturation, and made it easier for additional components (dyes, crosslinkers, etc) to be incorporated into the film and for the film to be fed through the system 46 for further processing.

The process further involved (4) soaking the PVA film in a heated dichroic dye bath in water in a tank containing a dichroic solution. A center roller positioned within a portion of the tank containing the dichroic solution was raised or lowered to control the path length traveled by the film in the tank, and hence, to influence the time the film spent in the tank. The dyeing step occurred by absorption or deposition of dyes to polymer chains of oriented polyvinyl alcohol film. In other embodiments, this step can be carried out before, at the same time as, or after the stretching step. The film was dyed at a temperature of between about 30° C. and about 60° C., and preferably between about 40° C. and about 50° C., and most preferably at 45° C. for 4 minutes, depending on the distance or span length between the rollers in the tank and the overall speed of the assembly line.

After the dyeing step, the process further included (5) rinsing the PVA film with a water rinse bath at 25° C. for 2 min to rinse excess dye in a rinsing tank. The dye tank 5 was heated to keep the dye in solution. The process then further included (6) submerging and soaking the PVA film in a boric acid cross-linker bath, while stretching the film in a cross-linker tank/main stretching tank. The boric acid crosslinking tank 6 was heated. Heating the dye solution and the boric acid solution helped to reduce or prevent precipitation of the solutions. In another embodiment, the method can further comprise filtering the dye and/or boric acid solutions to reduce or prevent precipitation and recrystallization of the dye and boric acid in the tanks. Heating of the film helped to reduce the crystallinity level of the PVA polymer film host matrix so the film can stretch more and accept more dye guest molecule in free-volume regions between the host polymer molecular backbone. The PVA crystalline regions reform on cooling and drying.

The boric acid crosslinker solution had a concentration of between about 1% and about 5%, more particularly about 2% in water. In particular, the boric acid crosslinker solution had a maximum solubility of ~5% at room temperature. The film was soaked in the boric acid solution for between 1-5 minutes, preferably for about 2 minutes, at a temperature of between about 20° C. and about 40° C., more preferably at a temperature of about 30° C. The boron soaking step was carried out to improve resistance to heat, water, and organic solvents, to increase thermostability by forming cross bridges among PVA chains, and to form chelate compounds with dye molecules to stabilize the film. In this example, the film was stretched during boric acid soaking treatment. In other embodiments this step can be carried out before, at the same time as, or after stretching of the PVA film. Although boric acid was used, other metal compounds comprising transition metals may be used, for example, borax, glyoxal, and glutaraldehyde. Metal salts such as acetates, nitrates and sulfates of fourth-period transition metals such as chromium, manganese, cobalt, nickel, copper and zinc can also be used. Metal solutions comprising any of the following may be used: manganese (II) acetate tetrahydrate, manganese (III) acetate dihydrate, manganese (II) nitrate hexahydrate, manganese (II) sulfate pentahydrate, cobalt (II) acetate tetrahydrate, cobalt (II) nitrate hexahydrate, cobalt (II) sulfate heptahydrate, nickel (II) acetate tetrahydrate, nickel (II) nitrate hexahydrate, nickel (II) sulfate hexahydrate, zinc (II) acetate, zinc (II) sulfate, chromium (III) nitrate nonahydrate, copper (II) acetate monohydrate, copper (II) nitrate trihydrate and copper (II) sulfate pentahydrate. Any one of these metals may be used solely, and alternatively, a plurality of types of such compounds may be used in combination.

During the process using the roller system illustrated in FIG. 1, tensional forces of the rollers stretch the wet film 3. The speed of the rollers 12 was progressively increased (see Table 1 below) from tank to tank as the film advanced from the upstream side 72 to the downstream side 85 of the assembly. "Upstream rollers" rollers are described herein as those located closer to the starting point of the system line 46, i.e., starting with rollers used in process steps 2 through 4, while downstream rollers are those referred to as those used in steps 5 through 7. For example, the roller speed in tank 3 was faster compared to the roller speed in tank 2 in order to accommodate the extra length of the PVA film as a result of the film swelling in all dimensions. Downstream rollers have higher speeds, compared to upstream rollers.

TABLE 1

| | TANK # | | | | | | |
|---|---|---|---|---|---|---|---|
| | 2 | 3 | 4 | 5 | 6 | 7 | Oven |
| Tank Function | Water, swell | Water, soak | Dichroic Dyes | Dye Rinse | Boric Acid | B.A. Rinse | Dry |
| Roll Speed Ratio (SR) | 1.5 | 1.9 | 2.8 | 2.8 | 3.3 | 3.3 | 3.3 Unwind speed |

In this mode a film is placed in the top portion of a tank 14 (FIG. 1) containing a wet solution. The top portion of the tank is the portion closest to the air above the tank while the bottom portion is the portion closest to a bottom surface of the tank. The stretching of the film 3 is done in the bottom portion of the tank 14, i.e., the distance or span length between the two rollers submerged at the bottom of tank 14. The greatest amount of stretching of the film 3 occurred in the crosslinking (boric acid) tank 6, followed by the stretching of the film 3 that occurred in dye tank 4. Thus the method further comprised incrementally increasing the speed or tangential velocity of at least one set of driven nip rollers of the system 46 to accommodate the stretched film 3. More particularly, the method further comprised incrementally increasing the speed of at least one downstream nip roller such that it had a faster speed or tangential velocity compared to at least one upstream nip roller. The tangential velocity or roller speed of the conically shaped rollers described herein is a function of the diameter of such rollers. The tangential velocity (meter/min) is calculated using the roller diameter x rpm. Cylindrical rollers in motion only have one velocity, whereas conical or frusto-conical rollers in motion have a velocity that increases as the roller diameter of a conical roller increases, described in more detail below.

The process then involved (7) rinsing the film 3 in a water bath at 25° C. for 2 min to rinse off excess boric acid in a rinsing tank. The step of (8) drying the film 3 was then carried out in a convection dryer or drying oven 16. The PVA film was dried at a temperature of about 70° C. or higher, preferably at a temperature of between about 90° C. to about 120° C. for 1 to 120 minutes, preferably for 3 to 40 minutes, and most preferably at a temperature of about 80° C. for 15 minutes, while maintaining the film in a stretched state. To prevent excess heating, evaporated moisture from the PVA film was immediately removed to accelerate evaporation. The heat resistance of the PVA film depends on its moisture content. This method allowed the PVA film to be dried, while suppressing a temperature increase.

After the film is dried, optionally then the film can be put through a lamination process using laminate films 26 with TAC (PC, Acrylic, COC, or other) films. Optionally adhesives 20 can be added or combined with the PVA film 3, followed by further curing in a curing oven 24. Further, optionally the addition of at least one protective liner 33 (if not already present on the TAC films) can be added to at least a portion of the film to produce a final optical film product 18, which can then be used in an optical article such as an ophthalmic lens, for example. The film can then be wound onto a roll, such as that illustrated in FIG. 8, for example. Optionally, the process can involve dye dipping the film to add gradient tinting, color, or photochromic agents, or optionally further stretching the film. In one aspect the film 3 can be protected by laminating in between two clear protective films. To accomplish this, a transparent protective film or sheet can be laminated to the surface of the polarizing film 3 using an adhesive layer. Transparent protective layers that can be used are selected from transparent resins such as triacetyl cellulose (TAC), cellulose acetate butyrate (CAB), polycarbonate, thermoplastic polyurethane, polyvinyl chloride, polyamide, and polymethyl methacrylate.

Stretching Step—"Pure Stretch Mode"

Figure 2A:
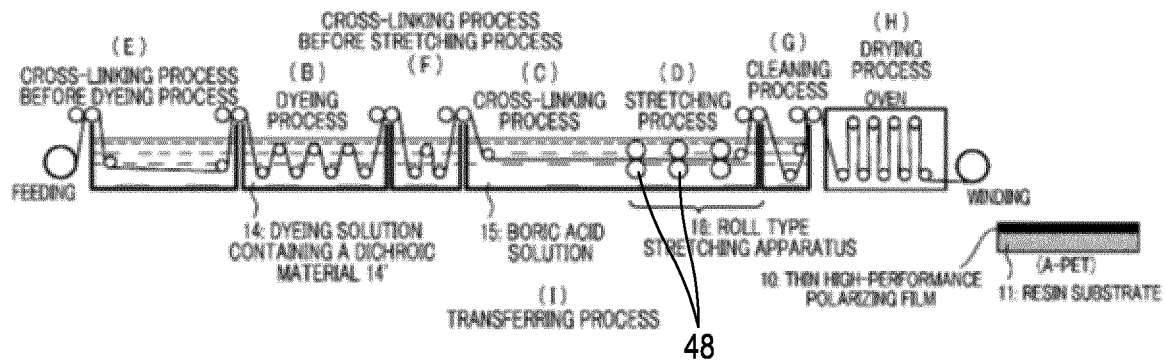
FIG. 2A illustrates a side view of a prior art apparatus for stretching an optical film in a "pure stretch mode."
Figure 2B:
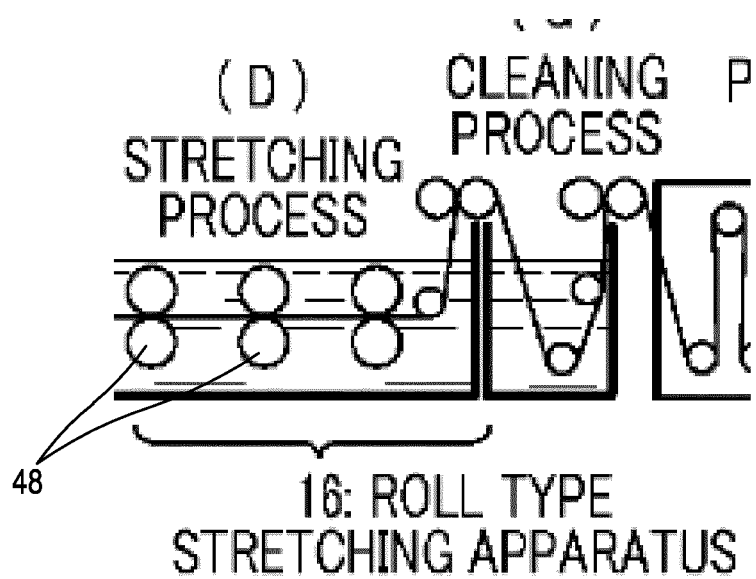
FIG. 2B illustrates a side view of a section of the prior art apparatus of FIG. 2A.

The invention disclosed herein focuses on step (6), stretching of the PVA film. Referring to FIGS. 2A and 2B, a conventional film stretching process known in the art as "pure stretch mode" is described in US2012/0327512 and U.S. Pat. No. 2,547,736, both herein incorporated by reference. "Pure stretch" is achieved when a "span length" is distance between two stretching rollers is sufficiently large enough to produce strain hardening, but may not be achieved in all stretching processes. In a continuous stretch process, the PVA film is stretched a small amount as the film travels from tank to tank before it is dried in an oven. The greatest stretching of the film occurs in section "D—Stretching Process," as noted in FIG. 2B, in which three pairs of cylindrical nip rollers (for 2-stage stretching) are illustrated (but two pairs of cylindrical nip rollers can also be used). In the "pure stretch mode" the film is longitudinally and continuously stretched in a direction lengthwise thereof by a pair of spaced-apart sets of driven nipped rollers 48, having opposed tensional forces. In this method cylindrically shaped rollers only are used in the film stretching process. One of the tensional forces of one of the set of nipped rollers 48 is typically of greater magnitude than the other nip roller pair to continuously draw and move the film lengthwise as it undergoes stretching and/or deformation.

The film is stretched continuously and longitudinally by drawing it through the two spaced-apart sets of rotating rollers 48, each set comprising at least two pressed-together rotatably mounted pinch or nipped pressure rolls between which the film is gripped. The opposed tensional forces required for stretching are set up by rotating the rolls at the output end, or downstream, end of the apparatus at a greater peripheral speed than at the input, or upstream, end. Thus, a sheet of film can undergo stretching between a set of input nip rollers and a set of output nip rollers. Due to the pressure contact between the rolls in each set, each freely rotatable roll will be rotated at substantially the same peripheral speed as a driven roll in that set. In one embodiment, a polyethylene (PET) carrier can be used to stretch the PVA film down to 20 microns (for thin e-display applications). For film used in ophthalmic lenses, such as polarized lenses, however, a carrier is not necessary. Although not illustrated, means for driving the input and output rollers 48 may comprise an electric servo motor or other prime mover drivably connected to the power input shaft of a gear box. A power take-off shaft on the gear box can be drivably connected through a drive chain and suitable sprockets to the input roller. The power take-off shafts of the gear box can be arranged to be rotated at suitable speed differences to give a desired speed ratio for the input and output rollers.

Pure Stretch Using Frusto-Conical Rollers

Figure 3A:
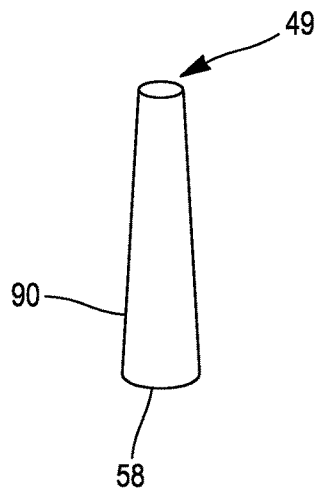
FIG. 3A illustrates a front view of a substantially conical or frusto-conical roller used in the system of FIG. 3B.
Figure 3B:
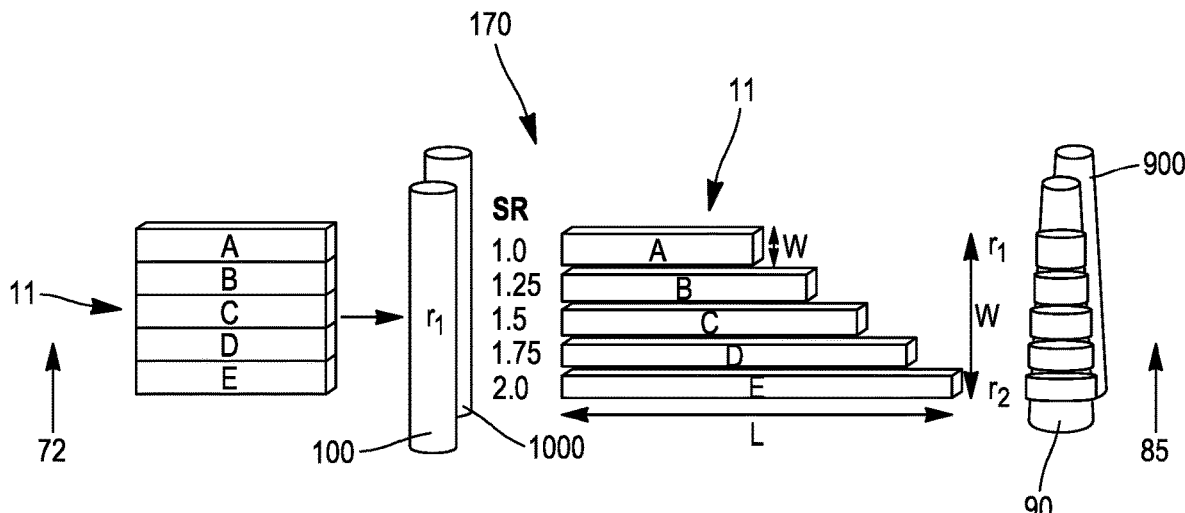
FIG. 3B illustrates a top view of an exemplary roller system that can used for stretching a film in a "pure stretch mode."
Figure 3C:
FIG. 3C illustrates a side view of the roller system of FIG. 3B.

Referring to FIGS. 3A through 3C, in contrast to the "pure stretch mode" known in the art, in Applicants' pure stretch system, during the stretching step 6, at least a portion of the cylindrically shaped rollers 12 in tank 14 of the assembly line are replaced with substantially conically-shaped or frusto-conical nip rollers 90, 900, as illustrated in FIG. 3A. The conical or frusto-conical rollers have a radius that continuously and gradually increases from a first radius closest to the apex 49, to a second radius, furthest from the apex 49, wherein the second radius is larger than the first radius. In particular, each of the conical rollers has a gradually increasing radius of from about 150 mm to about 500 mm, or roughly, the stretch ratio is the ratio of the conical roller radii ($R_{large}/R_{small}$). The "base radius" of a circular cone is the radius of its base 58 or radius of the cone. The terms "substantially conical" and "frusto-conical" are interchangeably used in herein. Each of the conically shaped rollers 90 has an apex 49 and a vertex angle such that the cone radii of the conically shaped rollers allows for the production of an optical film having a desired film stretch ratio ("SR") (defined below) gradient from a minimum at one film edge to a maximum at the other film edge, as described herein.

The system illustrated in FIGS. 3B and 3C is used during step 6 of the stretching process illustrated in FIG. 1. This roller system 170 is positioned within a portion of a tank 14 and comprises at least one pair of cylindrical nip rollers 100, 1000 and at least two substantially conical/frusto-conical nip rollers 90, 900, as described above. More particularly, the pure stretch process used herein for stretching the PVA film comprises a system comprising at least two cylindrical rollers on the left side or upstream side 72 of the system and at least two substantially conical roller or frusto-conical roller on the downstream side 85 of the system, as illustrated in FIGS. 3B and 3C.

In one aspect, more than one optical film 3 can be stretched at a time. Alternatively, a single film having a large width can be cut or slit length-wise into several small lengths or lanes, and each lane can be independently stretched. As illustrated in FIG. 3B, a single optical film can be placed in each of film lanes A through E such that each film is stretched to have a different stretch ratio. One or more optical films 3 can be fed into the system 170 comprising one or more rollers, each roller having a certain radius r1. In one embodiment, each of the films 3 or a film 3 slit into lanes is placed in a film lane A through E, respectively. The lanes labelled as A through E and the increasing diameter cylinder roll segments are illustrative aids only, as is the SR from 1-2 in 0.25 increments. The web, rollers, and SR are continuous in practice. Each film 3 is stretched such that is has a stretch ratio of a certain numeric value ranging from 1 to 2, as noted next to the cylindrical rollers 100, 1000. In another aspect, a single optical film 3 can be stretched across lanes A through E. The higher the stretch ratio, the longer the piece of film, as illustrated.

As illustrated in FIGS. 3A and 3B, the first and second supply or input rollers 100, 1000 onto which the unstretched optical film 3 is placed can be substantially cylindrical. Each cylindrical roller can have a diameter of about 150 mm to about 450 mm for a small machine, and up to about 900 mm for larger machines. In particular, typical film widths are about 150 mm for a small lab scale unit to about 1-2 meters for a larger commercial machine. Most commercially extruded film is about 0.5 m to over 2 m wide. Wider unstretched films can be cut or slit into smaller diameter rolls. Each of the rollers 100, 1000 has an outer circumferential surface that is configured to allow the film 3 to rotate in a direction (illustrated by the arrow) of the roller 100 along an inner circumferential surface of the rollers 100, 1000.

As illustrated in FIGS. 3B and 3C, after being stretched through the cylindrical rollers 100, 1000, the optical film(s) 3 are then supplied to at least two substantially conically shaped or frusto-conical rollers 90, 900. This configuration can be considered a hybrid type of stretching machine, incorporating a pure stretch mode and gap stretch mode. The film 3 is wound around the roller 90 in a first direction, then wound around the conical roller 900 in a second direction that is opposite the first direction, in this order. In this embodiment, the average distance between the nip rollers 100, 1000 and 90, 900 can be between 1-2 meters apart.

In FIG. 3B film 3 enters the nip roller assembly from an upstream process. Typically one or more films (usually just one film) can enter the nip rollers as shown in FIG. 3C. The conical rollers 90, 900 rotate at a higher rpm than the conical rollers and pull and stretch the film 3. FIG. 3B illustrates a single film 3 that is extends from lanes A through E in width. The nip rollers 100, 1000 are used to hold the film and prevent film slippage while the film is being pulled by nip rollers 90, 900. As a visual aid, lanes of film 3 have been drawn in the figure that illustrates the different pull lengths (stretch ratios) as a result of different diameter sections of nip rollers 90, 900. The larger roller diameter section would pull (stretch) the film more than the smaller diameter section.

In another aspect, a wide single film 3 can enter the nip roller 100, 1000 where it is slit into several smaller widths. Slitting knives for slitting the film can be located before or as part of the nipped roller assembly. In this embodiment, every other lane (A, C, E, for example) is stretched by a separate conical nip roller 90, 900 assembly. The conical nip rollers are made up of smaller roller sections that are only as wide as the slit film lanes. Just as before, each lane is stretched in proportion to the diameter of the smaller nip rollers.

The stretch ratio of the film 3 varies continuously with the conical diameter of the rollers. If the film 3 contains iodine, a dichroic dye, or another alignable dye, then a gradient polar film can be produced with the polarization efficiency increasing from a smaller to larger radii of the conical roller. In the pure stretch mode, the ratio of the width of each film as it enters each tank to the film width as it exits out of each tank equals the ratio of the film thickness into each tank and the film thickness exiting out of each tank. For optical film applications, the pure stretch mode is preferred, compared to other stretching modalities.

The rollers described herein may be fabricated or from a resin such as a silicone resin, a urethane resin, an epoxy resin, an ABS resin, a fluorocarbon resin, or a polymethylpentene resin. The rollers may also be obtained by plating a resin. Alternatively the rollers may be fabricated from a material obtained by mixing various kinds of metal powders with a resin. Alternatively, the rollers described herein may be comprised of a metal such as aluminum, brass, or steel. Metal rollers are preferable since they exhibit excellent heat resistance and mechanical strength, are suitable for continuous production and precision molding, are rarely scratched, exhibit high durability to polymerization heat generation, and rarely deform.

In the isochoric, "pure stretch process" (constant volume stretch): Length (L)×Width (W)×Thickness (T) of the film=$\lambda L \cdot W/(\lambda^{0.5}) \cdot T/(\lambda^{0.5})$ where $\lambda$ is the stretch ratio (SR). If the optical film 3 is not stretched at all, the stretch ratio is 1. During the stretching process, the PVA film is continuously and asymmetrically stretched using at least one conically shaped or frusto-conical roller 90, 900, each having a gradually increasing radius ranging from r1 to r2, while soaking in the boric acid bath, to produce a polarized film. As the film 3 is stretched, the color intensity of the film is maintained, while the thickness of the film decreases by $1/(\lambda^{0.5})$, thereby allowing the film to appear lighter in color (Beer's Law). It is noted that the color intensity of the film will change with thickness, according to Beer's law (Absorbance at $\lambda_{max}$=log($I_0$/I)=$\varepsilon_{\lambda max}$c·l).

In an exemplary embodiment, the PVA film 3 can be stretched to about 4 times its original length and width, and its thickness is reduced to about 50% of the original thickness, namely, about 38 microns.

In one aspect, the film 3 can be stretched to have a stretch ratio of between 1 and 4, preferably between 2 and 3.8, preferably less than 3.5, and more preferably about 3.3, while having a polarization efficiency (PE) of between about 90% and 100%.

The polarization efficiency is related to the extent of alignment of the absorptive component of the dye molecules (dichroic dye or iodine) with the alignment of the PVA molecular backbone chains in the stretch direction and is determined by measuring the spectral transmittance parallel ($T_\parallel$) and perpendicular ($T_\perp$) to the films stretch direction and calculated using the formula PE=$((T_\perp - T_\parallel)/(T_\parallel + T_\perp))^{0.5}$. In another embodiment, the polar film can have a stretch ratio of 2 and a polarization efficiency of between about 40% and about 50%. It is noted that the human eye does not perceive a polarization efficiency of less than 50%.

The extent of film stretching across the width (W) of the film is directly proportional to the differential tension produced by the conical nip rollers 90, 900 that is the result of the differential tangential velocity across the length (diameter) of the conical rollers. The film 3 is preferably stretched in a substantially flat or substantially planar position and moved under stretching forces exerted by the moving rollers so that its longitudinal axis (also indicated by "L" in FIG. 3B) is substantially at right angles to the input rollers 100, 1000 and output rollers 90, 900. Stretching of the film may also occur by the processes described herein even though the film 3, in a substantially sheet material form, is not maintained in a substantially flat or substantially planar condition and even though it may be folded, wrinkled or creased.

In one embodiment the PVA film containing a non-dichroic dye can be stretched to a stretch ratio of 3, but a non-dichroic dye will not align with PVA molecules in the PVA film, so the polarization efficiency would be 0 in such a case, and the thus the film would not be polarized.

Hybrid Roller System

In yet another embodiment, a film 3 can be stretched using a hybrid roller system where the stretching roller can be partially cylindrical and partially conical or frusto-conical in shape. This will allow the film 3 to be uniformly stretched on the cylindrical portion of the roller and asymmetrically stretched on the conically shaped or frusto-conical section of the roller. For example, of the roller is 50% conical and 50% cylindrical then the film being rolled over an outer surface of the cylindrically shaped portion of the roller would have a stretch ratio anywhere between SR=1 (non-stretched) to SR=1'. SR=1' can be from SR=1 (non-stretched) up to SR=3 or 4, and the stretch ratio using the conically shaped roller portion would be from SR=1' to SR=2'. For example, if SR 1'=SR 1, then one-half of the film is un-stretched. If SR 2'=SR 3, then the PE is 99%. This enables the production of an ophthalmic lens that has no PE on a bottom half or lower portion of an ophthalmic lens, and the top half or top portion of the lens increases from a PE of 0% in the middle up to a PE of 99% at the top of the lens.

For cylindrically shaped nip rollers (standard condition) with constant radius $r_{cyl}$, the angular velocity is $\omega = d\varphi/dt$ and tangential velocity is constant at $v_{cyl,\perp} = r_{cyl} \cdot d\varphi/dt$.

For conically shaped nip rollers with radii increasing from $r_1$ to $r_2$ (e.g., $r_2 = 3 \cdot r_1$), the circumference increases from $2\pi \cdot r_1$ to $2\pi \cdot r_2$ (e.g., substituting $2\pi \cdot r_2 \Rightarrow 6\pi \cdot r_1$, i.e., triple the circumference) and its tangential velocity continuously increases from $v_{1,\perp}=r_1 \cdot d\varphi/dt$ (@ $r_1$) to $v_{2,\perp}=r_2 \cdot d\varphi/dt$ (@ $r_2$) (e.g., substituting to $v_{2,\perp}=r_2 \cdot d\varphi/dt \Rightarrow 3 \cdot r_1 \cdot d\varphi/dt$ (@ $r_2$), i.e., triples the tangential velocity).

The extension (stretch) ratio, ($\lambda = x_{final}/x_{initial}$) of the film 3 varies continuously with the diameter of the conically shaped rollers, and if the film 3 contains iodine, dichroic dye, or other alignable dyes, then a gradient polarized film is produced with the polarization efficiency increasing from the smaller to the larger radii of the conical nip roller. Using a larger radii may allow reflection from a wedge of a film that can be formed by the thickness gradient to direct light upward, due to being thinner at the top.

After the film 3 has been stretched, the length of the stretched film 3 varies across its width, so the stretched film 3 must be conveyed and wound up by conically shaped or frusto-conical rollers after it has been stretched in order to prevent the film from latitudinal wandering and forming a loosely wound roll of film. Alternatively, the film can be wound in a film winding device (FIG. 8), described below.

Pure Stretch Mode—Gradient Stretch

In another exemplary embodiment, the "pure stretch" mode can be used to stretch PVA film, in particular, using a gradient stretch. This process involves soaking, swelling, dyeing, and crosslinking the PVA film, as described in the steps above. The roller system (not illustrated) used to stretch the PVA film 3 consists of a first pair of nip rollers 100, 1000 that are substantially cylindrical on the left or "upstream" side of a roller system, a second pair of nip rollers 90, 900 that are substantially conical to the right of the first pair of nip rollers, and a third pair of substantially conical rollers (not illustrated) to the right of the second pair of nip rollers, if further film stretching is to be done. In this embodiment, after the first pair of substantially cylindrical rollers, all downstream rollers are substantially conically shaped, including those that are located in an oven. Before stretching, a film 3 will be a first length. After stretching, the film will have a second length that is half of the length of the first length. For example, before stretching, the PVA film that is used can be about 1 meter in width. After the PVA film 3 has been stretched, it will be half a meter in width for a stretch ratio of >3.3. In the pure stretch mode the ratio of the film width to film thickness remains constant during and after the stretching of the film. For constant W/T pure stretch, the stretch ratio increases for gap stretch because the film width is constrained.

Gap Stretch Mode

Figure 4A:
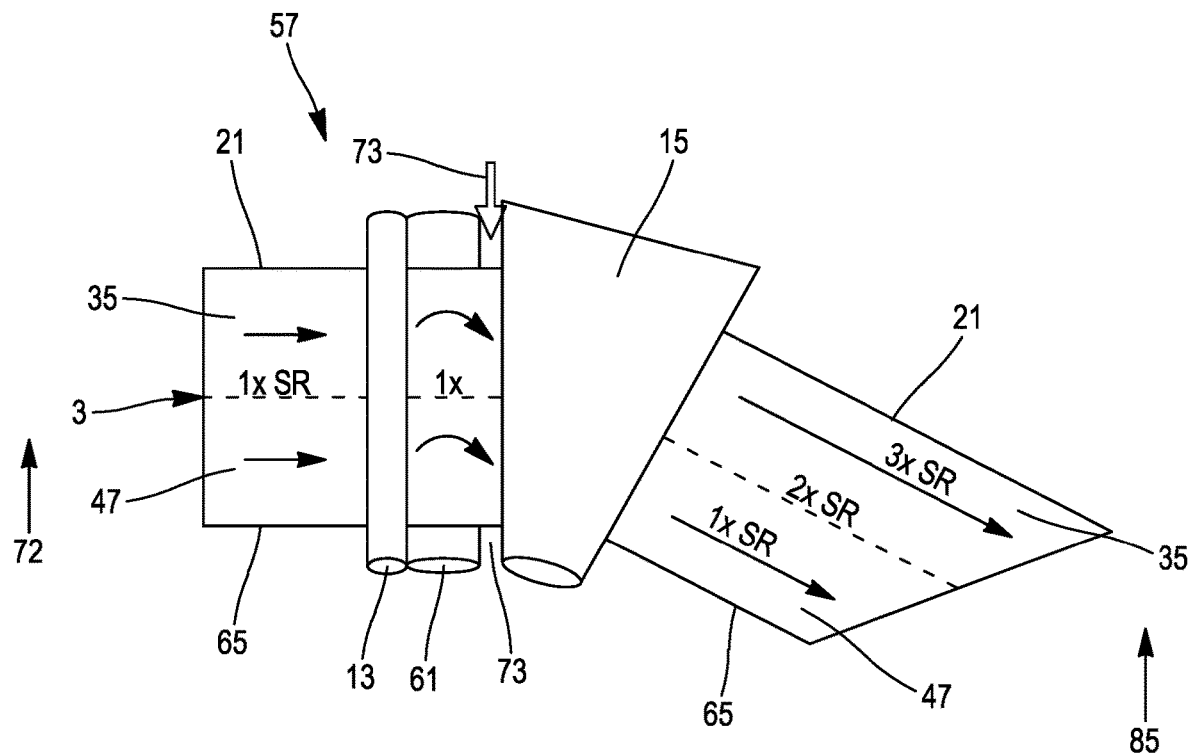
FIG. 4A illustrates a top view of an exemplary roller system having at least one cylindrical roller and at least one conical roller that can be used for stretching an optical film in a "gap stretch mode."
Figure 4B:
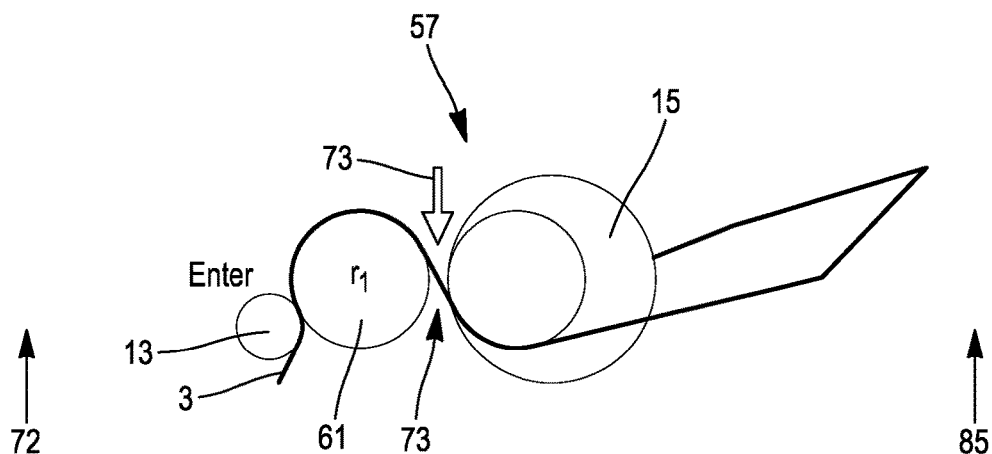
FIG. 4B illustrates a side view of the roller system of FIG. 4A.

Referring to FIGS. 4A and 4B, another embodiment of a roller system for stretching PVA film is illustrated. This embodiment is called a "gap stretch mode." In this embodiment, first and second cylindrical rollers 13, 61 are used as intake rollers for receiving the film 3. The first cylindrical roller has a first diameter, and the second cylindrical roller 61 has a second diameter that is larger than the first roller 13. The rollers can be any size. However, smaller rollers are better due to space constraints in a typical assembly. Roller 13 keeps the film on roll 61 from slipping in the downstream direction when roller 15 pulls and stretches the film. In one aspect, a similar roller would be positioned on roller 15 to keep the film from slipping in the upstream direction. The first and second rollers 13, 61 are positioned proximate each other to allow the optical film 3 to be in contact with both rollers simultaneously and continuously during the film stretching process. As the PVA film 3 is stretched, the molecules of the PVA film 3 become more evenly aligned and substantially polarized.

The stretching of the polymers in the PVA film also allows for the alignment of dichroic dyes in the optical film. If the PVA film containing at least one dichroic dye remains un-stretched, it will not have a polarization effect. To produce an ophthalmic lens that is polarized in one section (i.e., the top or upper portion, closer to a wearer's forehead, when worn by a wearer) but not a second section (i.e., a bottom portion, further away from a wearer's forehead, when worn by a wearer relative to a wearer's face), the stretch ratio in the two sections of the optical film used in the lens must be different.

In this gap stretch mode embodiment, a MDO (machine direction orientation) multi-stage style machine having short gap stretch conditions can be used to stretch the film in a narrow gap (i.e., a few millimeters to a few centimeters) between a substantially cylindrical roller 61 and substantially conical or frusto-conical roller 15. This narrow gap is important because it affects the strain rate. High strain rates will cause the film to break because the polymer chains cannot orient fast enough. Short gap stretch conditions means that such conditions involve dry, semi-crystalline films that are heated by the roller stack that makes up the MDO unit. The tangential velocity of stretched film 3 roller over an outer surface of the conical roller increases with the diameter of the roller. The increasing tangential velocity proportionally increases the stretch ratio of the film, and if the film contains dichroic dyes then a gradient polarized film is formed. Polarized film can be produced using the pure stretch stretching process described herein, with long gap stretch conditions, and using water plasticized PVA film stretched while submerged in an ionic crosslinking solution. Long gap stretch conditions involve a meter(s) length gap.

As the film 3 passes through the cylindrical rollers in the direction noted by the arrows, the film 3 can be stretched such that it has a stretch ratio of more than 1. The film 3 is then passed underneath the roller 13, such that it is wound around an outer surface of the roller 13, after which it is wound around an outer surface of the roller 61 in the direction of the arrows, and in an opposite direction as it rolled over an outer surface of roller 13, remaining at a stretch ratio of 1. The film is passed through a stretching gap 73 and then fed underneath conical roller 15 such that it is wound around an outer surface of the conical roller 15. The stretching gap is a gap between the cylindrical roller 61 and the conical roller 15. The first portion 35 of the film is stretched by a first portion of the conical roller having a larger diameter than the rest of the conical roller. Due to the shape of the conical roller, the optical film is stretched from 1 to 3 times the original length of the film. As illustrated, the first portion 35 of the film is stretched to have a stretch ratio of between 2 and 3, while the second portion 47 of the film remains at a stretch ratio of 1. In the gap stretch method, the optical film, before it's fed into the stretching apparatus, can be 50% of the final stretched film. If a film with final stretch ratio of 4 is desired, then the first portion would have a beginning stretch ratio of 2 before it enters the stretching phase using the gap stretch mode.

Gradient Stretch

In another embodiment, the film 3 can be stretched to have a gradient stretch. In this embodiment, the optical film has a first section 35 that corresponds to the upper section of the film and a first edge 21. The optical film also has a second section 47 of the film that corresponds to a lower section of the film, as described above, and a second edge 65. Starting with a constant tint across the width of film, the gradient stretching process produces a film that is thinner and lighter in color at the edge of the film that is stretched to a greater extent compared to the opposite edge. Thus, the polarization efficiency of the film increases towards the lighter tint. Starting with an asymmetrically tinted film, using a continuous film tinting process similar to that described in US2015/0261011, the gradient stretching process of the present invention can produce a film that is stretched thinner along a darker tinted side of the film. The color intensity of the thin, darker tint will match the intensity of the thicker, lighter tint to produce a constant tinted film. The gradient polarization efficiency increases with increasing stretch, i.e., the thinner side of film.

In yet another embodiment, a polarized film may be produced that has a stretch ratio of 2 on one edge of the film and a stretch ratio of 3 the other opposite edge of the film. A film having these features may be produced by using the asymmetric film stretching apparatus and process described herein by starting with an un-stretched film, having a stretch ratio of 1, then stretching one edge of the film up to a stretch ratio of 2 and the other edge up to a stretch ratio of 3. Alternatively, a film of this type may be produced using a standard film stretching machine comprising cylindrical rollers and uniformly stretching the film to a stretch ratio of 2. Next, this film having a uniform stretch ratio of 2 can be continuously and asymmetrically stretched using the apparatus and process described herein to stretch only one edge of the film up to a stretch ratio of 3. In this embodiment the opposite edge of the film has no additional stretch, and remains pre-stretched at a stretch ratio of 2.

Gap Stretch Mode—MDO

Figure 5:
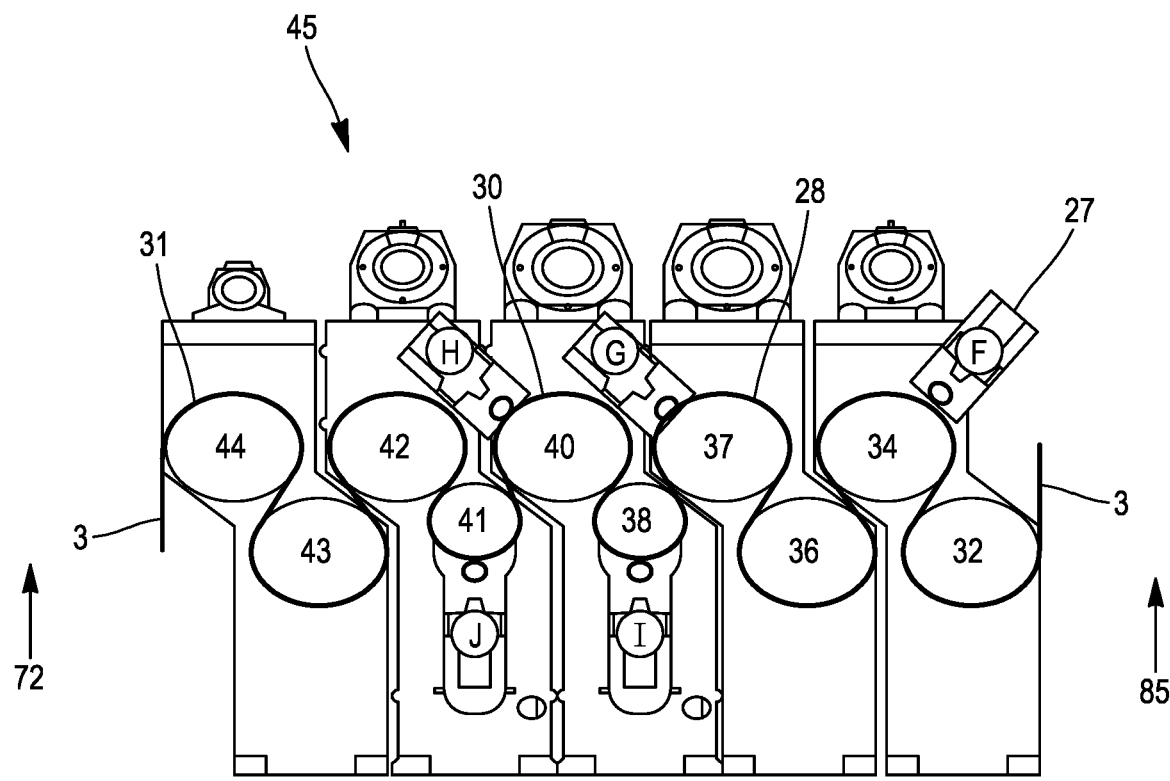
FIG. 5 illustrates a side view of a roller system that can be used for a gap stretch mode method of stretching an optical film, in a) an industrial machine direction orientation (MDO); or b) in a gradient MDO.

Referring to FIG. 5, a roller system 45 is illustrated in which the PVA film (or other polarisable film) can be stretched in a) a gap stretch mode: standard industrial MDO or b) a gap stretch mode: gradient MDO. A gradient is produced if the rollers used in this process are substantially conical. In the gap stretch mode, standard industrial MDO method the PVA film is uniformly stretched as it exits the roller system. In the gap stretch mode, gradient MDO the un-stretched PVA film is asymmetrically stretched as it exits a cylindrical roller system (nearest roller 44) using conically shaped or frusto-conical rollers are used to stretch the PVA film. The rollers are positioned in a substantially horizontal plane. During the gap stretch mode process, the width of the PVA film 3 is kept constant while the PVA film goes from a first thickness to a second thickness, wherein the second thickness is smaller than the first thickness. In the gap stretch mode the distance between the rollers in the roller system is much shorter, compared to the system used in the pure stretch mode. The gap stretch method produces PVA film with a different width to thickness ratio compared to the pure stretch mode. In the gap stretch mode, the width to thickness ratio is not constant or increasing, regardless of whether substantially conical or substantially cylindrical rollers are used in the roller system to stretch the PVA film and regardless of whether motor stretching is used.

In the gap stretch mode: standard MDO, film 3 were wound around 10 large substantially cylindrical rolls (numbered 32 through 44 for reference). In this system five nip roller system (F, G, H) pairs on the top 53 of the machine and I, J pairs on the bottom 54 of the machine, were used to prevent the film 3 from slipping during stretching. Stretching occurs in the gap 71 between rollers 37 and 38. This embodiment comprised four temperature zones: zone 1 (rollers 32, 34, 36) preheating, zone 2: stage 1 stretch (rollers 37, 38), zone 3: stage 2 stretch (40, 41): and stage 4: post stretch annealing rollers (42, 43, 44).

Gap Stretch Mode: Gradient MDO

In the gap stretch mode—gradient MDO process, the film 3 was successively wound around the first four cylindrically shaped large rollers (32, 34, 36, 37) and cylindrically shaped nip rollers F and G. In this embodiment, large rollers 38, 40, 41, 42, 43, 44 were conically shaped or frusto-conically shaped, as were nip rollers H, I and J. The smaller diameter of the conically shaped rollers were positioned on the operator side of the apparatus 45, while the larger diameter of the conically shaped rollers are positioned on the motor side. The operator side refers to the front of the machine that is accessible to the operator, whereas the back side of the machine is where the mechanical and electrical components are housed. In FIG. 5, the motors are situated on top of the housing cabinet. In this embodiment all downstream rollers (i.e., 38 through 44) are substantially conically shaped or frusto-conical. The configuration of the machine 45 may not be in a horizontal plane, in contrast with the standard MDO design described above. The method may further involve winding the film 3 around roller 100 in a first direction, then winding the film around the roller 1000 in a second direction that is opposite the first direction.

Batch Process

Figure 6A:
FIG. 6A illustrates a pre-stretched optical film that can be used in the stretching process described herein as a "batch process" method.
Figure 6B:
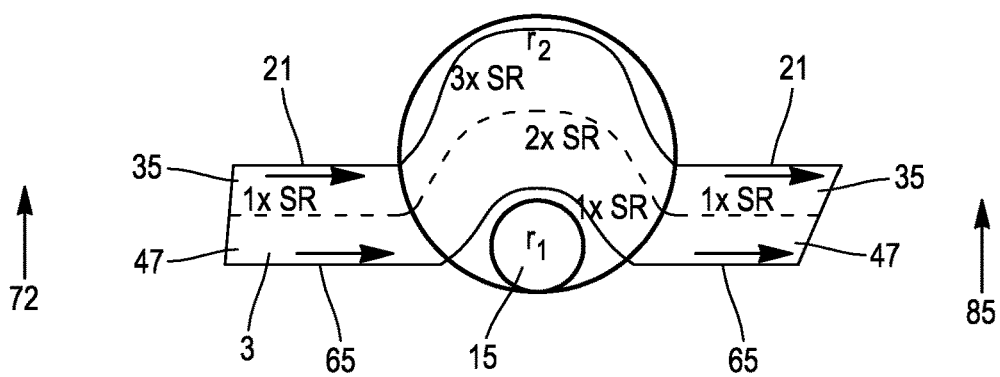
FIG. 6B illustrates a portion of the pre-stretched film of FIG. 6A being stretched over a stationary substantially conical or frusto-conical roller.
Figure 6C:
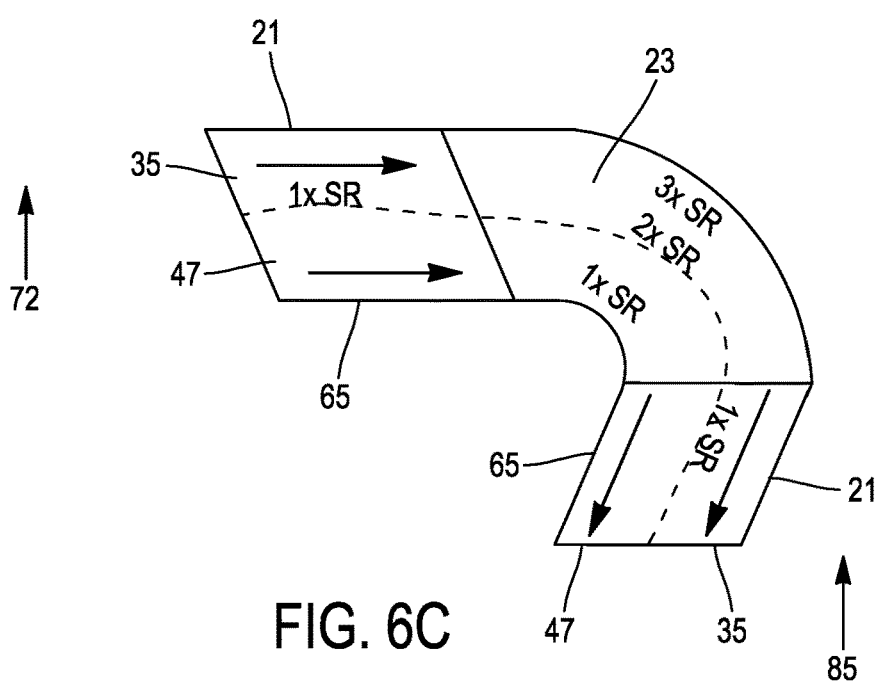
FIG. 6C illustrates the film from FIG. 6B after at least a portion of the film has been stretched using the substantially conical or frusto-conical roller and removed from the roller.

Referring to FIGS. 6A through 6C, another embodiment for stretching an optical film is illustrated, known as a "batch process." In this embodiment, the method further involves pre-stretching a non-stretched optical film 3 having a SR=1 (FIG. 6A) before it is stretched by a roller 15 from a stretching system (FIG. 6B) using one or more conically shaped or frusto-conical rollers 15, while pulling the sheet over the roller 15 and simultaneously thermoforming around a stationary cone-shaped mold roller.

In yet another embodiment (not shown), the film 3 can be stretched at its center along a pivot point by the conically shaped roller substantially in the center of the film. The pivot point may extend along a length of the center of the film 3. The stretching of the film 3 is greater where it is stretched by the wider section of the conically shaped roller compared to the more narrow portion of the conically shaped roller. Thus, when viewing the roller 15 from its more narrow end, the film that is stretched closer to the viewer will be less stretched or not stretched at all, in some cases, compared to the section of the film that is farther away from the viewer.

FIG. 6B is a static device that is similar to an angled cylinder that is put into contact with a stationary horizontal film that is clamped on both sides. The angled cylinder is raised through the film and contacts one side on the film first and stretches the film as sections of the film make contact with the cylinder. As an alternative, the center cylinder can have a pivot joint at one side of the film while the second side is raised to create a gradient stretch (second side having the higher SR).

In another embodiment, the device illustrated in FIG. 6B could be positioned similar to that of an Intron tensile tester, except that grips used to secure the film 3 would be positioned at an angle relative to each other. The angle between the grips is used to set the stretched gradient (via an initial film length) from the first side of the film to the second side of the film. In one aspect, a grip could be positioned on each side of the film to secure the film. In this embodiment, one side of the film would have an un-stretched length of 1× and the other side may have a stretched length of 3× (i.e., if the grips are positioned relative to each other at a large angle). If the extension was stopped after the grips moved an additional 2× such that the film was extended an additional 2×, apart then the short side of the film would be 3× and the other side 5× in length. Thus, the "shorter" side of the film would have a stretch ratio of 3/1 (SR=3), and the longer side of the film would have a SR of 5/3 (SR=1.67).

In these angled cylinder and angled Instron grip embodiments the film could be stretched, but the stretch may not be uniform across the length and width of the film. In these embodiments the film would have to stretched one at a time. The roller 15 has a radius ranging from a first radius of r1 to a second radius of r2. Before the film 3 is stretched by the conically shaped roller 15, a first portion 35 of the film 3 and a second portion of the film 47 each have a stretch ratio of 1. During the stretching of the film 3 by the conically shaped roller 15, the first portion 35 of the film is stretched such that it has a stretch ratio of between 2 and 3, and a second portion 47 of the film has a stretch ratio of 1 (FIG. 6C). As the optical film is stretched, the amount of molecular alignment increases, and the stretch ratio increases from a first edge 65 of the film to a second edge 21 of the film 3. The first portion 35 of the polarized film 3 can have a final stretch ratio of up to 4, more particularly between 3 and 4, and a polarization efficiency of up to about 99%. The second section 47 of the optical film 3 has a lower stretch ratio, for example, below 3, and a polarization efficiency of between about 0% and about 50%.

As illustrated in FIG. 6C, the film can have a stretch ratio of 1 on the "upstream" side 72 of the film, before being stretched, a stretch ratio of between 1 and 3 in the middle section 23 of the film, and a stretch ratio of 1 on the downstream side 85 of the film 3 where the maintains a stretch ratio of 1.

Alternatively, a batch process, as described herein, can be used to form an individual sheet of film over a substantially conical (or arched) surface to produce a gradient stretched film, wherein the stretched film has 3-4 times more stretch from the larger diameter to the smaller diameter of the cone.

Continuous Process

Figure 7A:
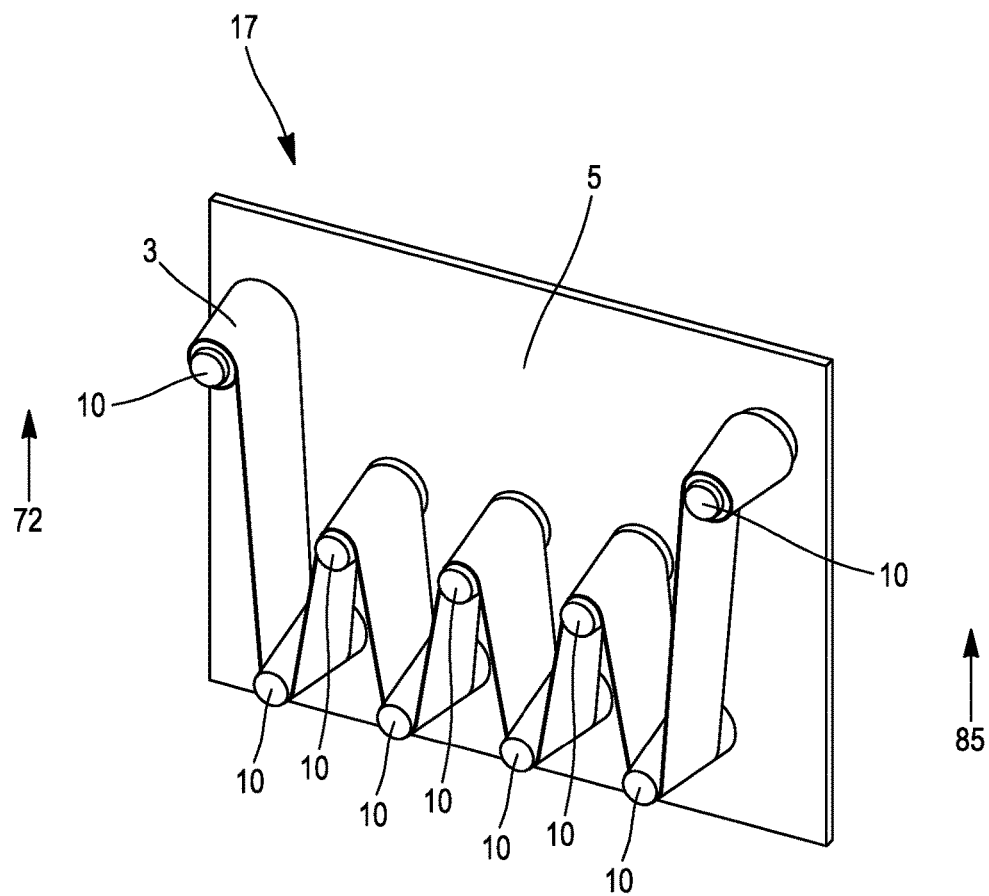
FIG. 7A illustrates an exemplary roller system that can be used for stretching an optical film in a "continuous stretch mode."
Figure 7B:
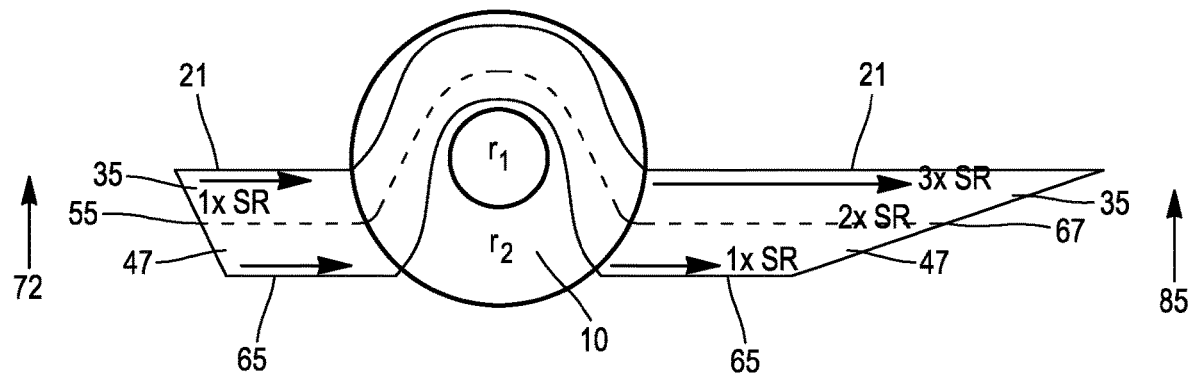
FIG. 7B illustrates the film from FIG. 7A before it is stretched by the conical roller on the left side and after it is stretched by the conical roller on the right side in the continuous stretch mode of FIG. 7A.

Referring to FIGS. 7A and 7B, an exemplary roller system 17 is illustrated that can be used in a continuous process for stretching. The roller system comprises an apparatus having a frame 5 to which various rollers 10 are secured. The frame can be immersed in a bath, such as a boric acid bath, as described above. The current method for stretching PVA films for optical purposes involves using only cylindrical rollers. In the embodiment illustrated in FIG. 7A, the system comprises nine cylindrical rollers. Each of the cylindrical rollers can have multiple independent cylindrical segments such that the segments at one end of the cylindrical roller would be rotating faster than at the opposite end of the same roller to accommodate the different film tangential velocities of the film. One of ordinary skill in the art may contemplate different roller configurations, including the addition of nip roller systems to prevent film slippage and tension isolation. All of the rollers in this embodiment are substantially conical in order to convey the film through this section of rollers. Although not shown, this embodiment must also comprise at least one nip roller that can be used to pull the film similar to the MDO unit (mid gap stretch device). In this embodiment the film is continuously stretched, but may not have a gradient stretch that is finally uniform.

In this embodiment the film 3 can be pulled over a series or plurality of conical rollers 10, allowing the conical geometry to stretch and shape the film 3. In this embodiment all the rollers are substantially conical or frusto-conical in shape (from film unwind to rewind units) because the stretched side of the film 3 travels a longer distance than the un-stretched side. In this embodiment a set of nip rollers (not shown) are needed to prevent film slippage and tension isolation prior to being received by the rewind unit. Re-winding of the film 3 after it has been stretched by the plurality of rollers 10 can be done using a conical core at a lower tension than the tension used during the stretching process.

In this "continuous" process, the film 3 is stretched at a slower rate on the upstream side 72 compared to the downstream side 85. The PVA film is continuously fed into the intake rollers on the upstream side 72 at about 1 m/min. The film continuously exits from the downstream side 85 at about 3 m/min. After stretching the PVA film, it can have a stretch ratio of 3 in the first portion 35 of the film to a stretch ratio of 1 in the second portion of the film 47, as illustrated in FIG. 7B.

Figure 8:
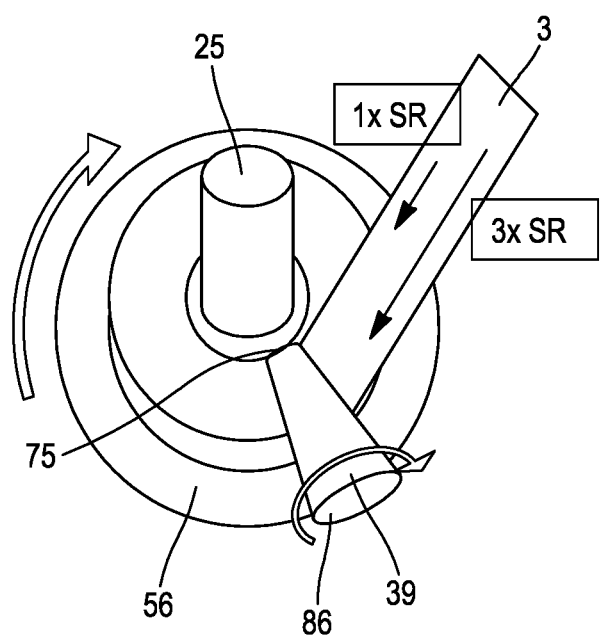
FIG. 8 illustrates a top view of a film winding device.

In this embodiment, the conical rollers, at their widest point, have a diameter that is three times the diameter ($d_{cyl.}$) of the cylindrical roller. As each conical roller completes a first revolution, the distance of the revolution that is completed by the conical roller is $\pi \cdot 3d_{cyl}$ (1 revolution). Thus, the stretched edge 21 at end 67 of the film ends up being longer than unstretched edge 21 at end 55 of the film after it is stretched, whereas unstretched edge 65 at end 55, 67 remains at the same length. The difference in length between edges 21 and 65 after stretching requires either a conical rewind core or a pancake style rewind unit (FIG. 8). A first portion 35 of the film is stretched more than a second portion 47 of the film 3.

As illustrated in FIG. 7B, the optical film 3 can be stretched such that the entire film 3, after being stretched on a conical roller 10, has a stretch ratio in the first portion 35 of the film of between 2 and 3 and a stretch ratio in the second portion 47 of the film of 1 (FIG. 7B). During and after the stretching of the optical film 3, the polarization efficiency increases from a second edge 65 of the second portion 47 to the first edge 21 of the first portion 35 of the film 3. During the stretching process, the same color intensity is maintained throughout the film, thereby producing a gradient polarized film. The color intensity can be measured by a spectrometer (i.e., Hunter or similar commercial device). After the film is stretched and put into an ophthalmic lens, then the lens can optionally be tinted. In one aspect the product can be tinted to have a gradient tint. Both the "batch" and "continuous" methods do not produce a uniform stretch across the film width. These methods also do not allow for tension control across the width of film, or allow for the ability to apply a high stretching force to the film without the use of additional conically shaped nip rollers.

Other Embodiments

In another embodiment, an optical film 3 can be produced having a stretch ratio of 2 at the second edge 65 of the second portion 47 of the film and a stretch ratio of 3 at the first edge 21 of the first portion 35 of the film. This type of film can produced by using the asymmetric film stretching apparatus and method described herein. To begin the process, an un-stretched film having a stretch ratio of 1 is used. The second edge 65 of the second portion 47 is stretched up to a stretch ratio of 2, and the first edge 21 of the first portion 35 is stretched up to a stretch ratio of 3.

Alternatively, to produce the same film described above, a standard film stretching apparatus comprising only cylindrical rollers can be used to uniformly stretch the film to a stretch ratio of 2. The method thus involves providing an optical film having a stretch ratio of 2, wherein the optical film comprises a first portion 35 having a first edge 21 and a second portion 47 having a second edge 65. Next, the asymmetric system and method described herein can be used to uniformly stretch only a first edge 21 of the provided film up to a stretch ratio of 3. Thus, the first edge 21 has a stretch ratio of 3, while the second edge 65 has no additional stretch and remains at a stretch ratio of 2.

Film Winding Device

Referring to FIG. 8, after a film 3 is continuously and asymmetrically stretched, the length of the stretched film varies across its width so the stretched film must be conveyed and wound up by substantially conical or frustoconical rollers to prevent the film from latitudinal wondering and forming a loosely wound roll of film. In addition to winding or collecting the gradient stretched film on a conical roller, a film winding device can be used to wind or collect an asymmetric film 3 in which one side is longer than the other. The film winding device (a "pancake winder") comprises a central cylinder 25 having a central axis. The central cylinder 25 is secured to a base 56. The film winding device further comprises a conical lay-on nip roller 39 having a first end 75 that is used to keep the least stretched portion 47 of the film and another end 86 that is used to keep the most stretched portion 35 of the film in contact with the already collected film 3 that is wound on base 56. The conical roller 39 is rotatable in a clockwise direction, as illustrated. The base 56 is rotatable in a clockwise direction, as illustrated. The film winding device allows the stretched film 3 to be wound flat around the central axis as the shorter, unstretched edge of the film will wind closer to the central axis than the longer, stretched edge that will wind further from this axis.

Ophthalmic lenses produced using the continuous, asymmetric methods described herein may be of a legal driving quality, for example, having a transmission (% T) of between 8% and 85%, more particularly between 8% and 18%. Transmission describes the overall intensity of light passing through a lens, typically represented as a percentage compared to the initial amount of light incident upon the lens. Lenses with a high amount of transmission absorb only low levels of light, allowing a high proportion of light intensity to be transmitted through the lens, which renders them not very useful for sunglasses lens. Lenses with very low transmission will absorb a very high amount of light, providing a lens so dark as to be nearly impossible to see through. The polarization efficiency of the lenses produced by the continuous, asymmetric method described herein will be high in the stretched portion (up to 99%) of the film (i.e., having a stretch ratio up to 3 or 4) and lower in the non-stretched portion of the lens (~0%), where the stretch ratio is 1. Finally, the lens itself may be additionally tinted to have a uniform % T (with a gradient polarization efficiency). In addition to the invention disclosed herein being useful for the improvement of optical articles such as an ophthalmic lens, the invention disclosed herein can also be used for many applications outside of the optical industry, for example, electro-optical applications for other types of coatings.

The particular examples disclosed above are illustrative only, as the present invention may be modified and practiced in different but equivalent manners apparent to those skilled in the art having the benefit of the teachings herein. It is, therefore, evident that the particular illustrative examples disclosed above may be altered or modified and all such variations are considered within the scope of the present invention. The various elements or steps according to the disclosed elements or steps can be combined advantageously or practiced together in various combinations or sub-combinations of elements or sequences of steps to increase the efficiency and benefits that can be obtained from the invention. It will be appreciated that one or more of the above embodiments may be combined with one or more of the other embodiments, unless explicitly stated otherwise. The invention illustratively disclosed herein suitably may be practiced in the absence of any element or step that is not specifically disclosed or claimed.

The invention claimed is:

1. A method for preparing a cross-polarization cancelling optical film for an optical article comprising:
   providing a film having at least a first section comprising a first edge, a second section comprising a second edge, a predetermined color intensity, and a thickness;
   providing an apparatus, wherein the apparatus comprises at least a first roller and a second roller, wherein the first roller and the second roller are configured to stretch at least a portion of the film; and
   continuously and asymmetrically stretching at least a portion of the film using the apparatus, while substantially maintaining the color intensity of the film.

2. The method of claim 1, wherein the method further comprises providing an apparatus, wherein the first roller is a substantially cylindrical roller and the second roller is a substantially frusto-conical roller.

3. The method of claim 1, wherein the method further comprises stretching the film such that the thickness of the film is reduced from the first thickness to a second thickness, wherein the second thickness is less than the first thickness.

4. The method of claim 3, wherein the method further comprises stretching at least a portion of the film such that at least a portion of the first section of the film has a first stretch ratio and a first polarization efficiency, and at least a portion of the second section of the film has a second stretch ratio and a second polarization efficiency.

5. The method of claim 4, wherein the method further comprises stretching the film such that the first stretch ratio and first polarization efficiency are greater than the second stretch ratio and second polarization efficiency.

6. The method of claim 4, wherein the method further comprises stretching the film such that the total stretch ratio, comprising the first stretch ratio and the second stretch ratio, and the total polarization efficiency, comprising the first polarization efficiency and the second polarization efficiency, of the film continuously decreases from the first edge of the film to the second edge of the film.

7. The method of claim 1, wherein the method further comprises providing an apparatus, wherein the first roller is a substantially cylindrical roller or a substantially frusto-conical roller, and the second roller is a substantially cylindrical roller or a substantially frusto-conical roller.

8. The method of claim 4, wherein the method further comprises stretching at least a portion of the first section of the film such that it has a stretch ratio of between 1 and 4 and a polarization efficiency of between 90% and 100%.

9. The method of claim 8, wherein the method further comprises stretching at least a portion of the second section of the optical film such that it has a stretch ratio of less than 3.5.

10. The method of claim 1, the step of providing the film further comprises providing pre-stretched film.

11. The method of claim 1, wherein the step of providing the film further comprises providing a film having a color gradient, wherein the color gradient varies continuously from the first edge of the first section of the film to the second edge of the second section.

12. The method of claim 1, wherein the method further comprises further processing the film using at least one of casting, injection molding, additive manufacturing, and tinting.

* * * * *